(No Model.)

W. P. COLDREN.
FRUIT JAR.

No. 336,552. Patented Feb. 23, 1886.

WITNESSES:

INVENTOR

UNITED STATES PATENT OFFICE.

WILLIAM P. COLDREN, OF PHILADELPHIA, PENNSYLVANIA.

FRUIT-JAR.

SPECIFICATION forming part of Letters Patent No. 336,552, dated February 23, 1886.

Application filed November 6, 1885. Serial No. 182,008. (No model.)

*To all whom it may concern:*

Be it known that I, WILLIAM P. COLDREN, a citizen of the United States, residing at Philadelphia, in the county of Philadelphia and State of Pennsylvania, have invented a new and useful Improvement in Fruit-Jars, of which the following is a specification.

My invention relates to the construction of a fruit-jar; and it consists in such formation of the jar-lid and clamp that, after the lid is put on and fastened and the air is expelled through a perforation provided for that purpose, the perforation is closed by a valve.

Figure 1:
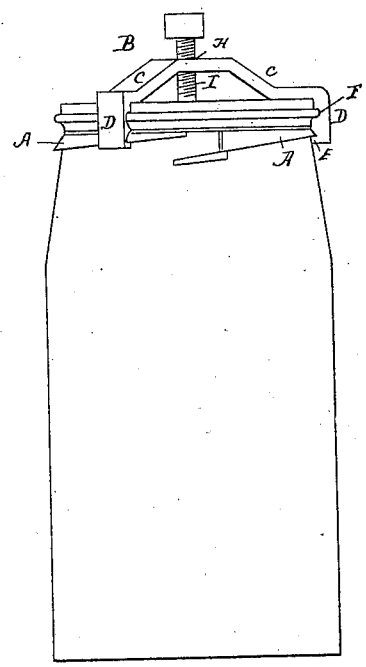
Figure 2:
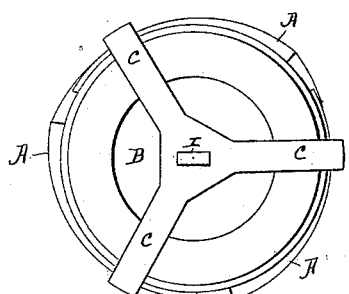
Figure 3:
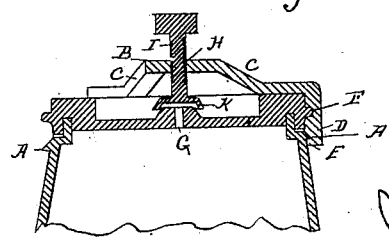

Referring to the accompanying drawings, Figure 1 is a side view of the jar. Fig. 2 is a top view of the same. Fig. 3 is a section showing the position and arrangement of the parts.

Like letters designate like parts.

The jar is made in the usual form, with the lid, which is perforated in the center, resting upon its top, and with inclines A A on the neck to engage with the clamp B, which stands clear of the lid in the center, and has arms C C engaging at their horizontal lateral extremities with the lid at its sides, and having vertical projections D, with lugs E engaging under the inclines and, when the clamp is screwed down, holding the lid down and the jar closed by pressure between the lugs under the inclines and the horizontal extremity of the arms over the sides of the lid, leaving the center of the lid clear, closing the jar securely by fastening the lid, but leaving the perforation in the lid free for the discharge of the air, which, when the jar is thus closed, necessarily remains between the contents of the jar and the lid. To discharge this air, I have made the perforation G in the lid, and to seal the jar after the air is expelled I make a threaded hole, H, in the bail of the clamp, putting into this hole a threaded bolt, I, with a valve, K, on its point, which, when the bolt is screwed down after the air is expelled, closes the perforation.

In practice the jar is filled with fruit, and the lid is put on, and the clamp is screwed down on the inclines, the screw-bolt being raised so as to leave the perforation in the lid free, as shown in Fig. 3, the jar being thus securely closed and safe to be handled. The jar is now put into boiling water and the air is expelled through the perforation, and when this is accomplished the valve is closed.

I claim as my invention—

In combination with a jar having inclines on its surface and a perforated lid or cover resting on top thereof, a clamp standing clear of the lid in the center, and having arms with horizontal lateral extremities adapted to engage with the side of the lid, and vertical extremities with lugs adapted to engage with the inclines and to hold the lid in place, and having also a threaded hole in the bail and a threaded bolt adapted to engage in said hole, said bolt having on its point a valve adapted to close the perforation in the lid after this has been fastened on by the clamp, substantially as described.

WM. P. COLDREN.

Witnesses:
E. G. HAMERSLY,
GEORGE HOUSE.